United States Patent
Kowalski et al.

(10) Patent No.: US 8,619,901 B2
(45) Date of Patent: Dec. 31, 2013

(54) SYSTEMS AND METHODS FOR PROVIDING UNEQUAL MESSAGE PROTECTION

(75) Inventors: John M. Kowalski, Camas, WA (US); Lizhong Zheng, Canton, MA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1246 days.

(21) Appl. No.: 12/110,191

(22) Filed: Apr. 25, 2008

(65) Prior Publication Data

US 2009/0268843 A1 Oct. 29, 2009

(51) Int. Cl.
*H04L 27/00* (2006.01)
(52) U.S. Cl.
USPC .......................................................... 375/295
(58) Field of Classification Search
USPC .......................................................... 375/295
IPC ........................................................ H03M 13/35
See application file for complete search history.

(56) References Cited

U.S. PATENT DOCUMENTS

| | | | |
|---|---|---|---|
| 4,965,883 A * | 10/1990 | Kirby .............................. | 714/49 |
| 5,353,352 A | 10/1994 | Dent et al. | |
| 5,396,239 A * | 3/1995 | McMahon et al. .............. | 341/58 |
| 5,550,809 A | 8/1996 | Bottomley et al. | |
| 5,742,678 A | 4/1998 | Dent et al. | |
| 5,771,288 A | 6/1998 | Dent et al. | |
| 6,397,367 B1 * | 5/2002 | Park et al. ..................... | 714/786 |
| 7,333,449 B2 | 2/2008 | Zimmermann et al. | |
| 8,196,010 B1 * | 6/2012 | Gunnam et al. ............... | 714/758 |
| 2002/0105960 A1 * | 8/2002 | Das et al. ...................... | 370/442 |
| 2006/0233127 A1 * | 10/2006 | Derryberry et al. .......... | 370/328 |
| 2007/0183384 A1 * | 8/2007 | Kwak et al. .................... | 370/338 |
| 2008/0153425 A1 * | 6/2008 | Heo et al. ........................ | 455/68 |
| 2008/0192622 A1 * | 8/2008 | Scheim et al. ................. | 370/210 |
| 2009/0003376 A1 * | 1/2009 | Horvat et al. ................. | 370/464 |
| 2009/0022133 A1 | 1/2009 | Wiberg et al. | |
| 2009/0097466 A1 * | 4/2009 | Lee et al. ....................... | 370/344 |
| 2010/0027450 A1 * | 2/2010 | Montojo et al. ................ | 370/311 |
| 2010/0157901 A1 * | 6/2010 | Sanderovitz et al. ......... | 370/328 |
| 2010/0162075 A1 * | 6/2010 | Brannstrom et al. ......... | 714/752 |

FOREIGN PATENT DOCUMENTS

| | | |
|---|---|---|
| EP | 0 565 506 | 10/1993 |
| EP | 0 776 555 | 6/1995 |
| JP | 10-507332 | 7/1998 |
| JP | 2008-028999 | 2/2008 |
| WO | 93/21709 | 10/1993 |
| WO | 96/05668 | 2/1996 |
| WO | 2007/030041 | 3/2007 |

(Continued)

OTHER PUBLICATIONS

Luca G. Tallini, Bella Bose, "Balanced Codes with parallel Encoding and Decoding," IEEE Transactions on Computers, vol. 48, Issue 8, Aug. 1999, pp. 794-814.

(Continued)

*Primary Examiner* — Shuwang Liu
*Assistant Examiner* — Sung Ahn
(74) *Attorney, Agent, or Firm* — Austin Rapp & Hardman

(57) ABSTRACT

Input data may be coded in accordance with a coding method that allows for either coded data or messages to be transmitted with pre-determined, but unequal reliability over a communication channel. The coding method may allow the messages to be transmitted with higher reliability than the coded data. Messages may be transmitted when they are available. Otherwise, the coded data may be transmitted.

15 Claims, 7 Drawing Sheets

(56) References Cited

FOREIGN PATENT DOCUMENTS

| WO | 2007/053071 | 5/2007 |
|---|---|---|
| WO | 2008/042255 | 4/2008 |
| WO | 2008/045001 | 4/2008 |
| WO | 2008/048188 | 4/2008 |

OTHER PUBLICATIONS

S. Borade, "When all information is not created equal: some fundamental limits and optimum strategies."

S. Borade, "An Information Theoretic Approach to Unequal Error Protection."

C. Ding, J. Yin, "Algebraic Constructions of Constant Composition Codes," IEEE Transactions on Information Theory, Vo. 51, No. 4, Apr. 2005, pp. 1585-1589.

S.C. Draper, A. Sahai, "Beating Burnashev in delay with noisy feedback," Proceedings Allerton Conference on Communication Control and Computing, 2006.

Office Action issued for Chinese Patent Application No. 2009801136699 on Nov. 5, 2012.

Office Action issued for Japanese Patent Application No. 2010-537201 on Feb. 5, 2013.

* cited by examiner

SYSTEMS AND METHODS FOR PROVIDING UNEQUAL MESSAGE PROTECTION

TECHNICAL FIELD

The present disclosure relates generally to wireless communications and wireless communications-related technology. More specifically, the present disclosure relates to systems and methods for providing unequal message protection.

BACKGROUND

Wireless communication devices have become smaller and more powerful in order to meet consumer needs and to improve portability and convenience. Consumers have become dependent upon wireless communication devices such as cellular telephones, personal digital assistants (PDAs), wireless access cards, and the like. Consumers have come to expect reliable service, expanded areas of coverage, and increased functionality. A wireless communication device that is utilized by users in a wireless communication system may be referred to as a mobile station, a subscriber station, an access terminal, a remote station, a user terminal, a terminal, a handset, a subscriber unit, user equipment, etc.

A wireless communication system may provide communication for a number of cells, each of which may be serviced by a base station. A base station may be a fixed station that communicates with mobile stations. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station. A wireless communication system may simultaneously support communication for multiple mobile stations.

The present disclosure relates to improvements in the field of wireless communications and wireless communications-related technology.

DETAILED DESCRIPTION

Figure 1:
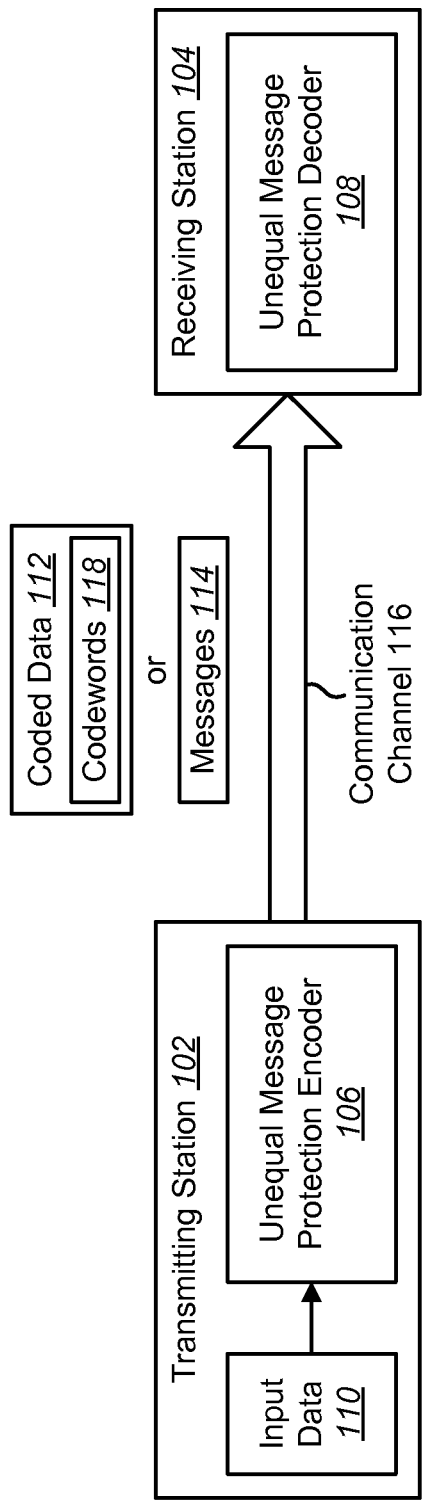
FIG. 1 illustrates a transmitting station in electronic communication with a receiving station.

A method for providing unequal message protection is disclosed. The method may include coding input data in accordance with a coding method that allows for either coded data or messages to be transmitted with pre-determined, but unequal reliability over a communication channel. The coding method may allow the messages to be transmitted with higher reliability than the coded data. The method may also include transmitting the messages when they are available, and otherwise transmitting the coded data. The messages to be transmitted may represent system control messages.

The coding method may result in codewords with a specified fixed distribution of symbols. At least one of the messages to be transmitted with higher reliability may include repetitions of one symbol.

The coding method may utilize a balanced code. At least one of the messages to be transmitted with higher reliability may include repetitions of one symbol. The balanced code may comprise a Manchester code or a code isomorphic to a Manchester code. The balanced code may be realized by a linear code preceded by a non-linear function which removes non-balanced codewords. The balanced code may be approximated by a linear code preceded by a non-linear function which removes non-balanced codewords within a Hamming distance $\delta$ of repetitions of a single symbol, where $\delta$ is a positive number.

A wireless device that is configured to provide unequal message protection is disclosed. The wireless device includes a processor and memory in electronic communication with the processor. Instructions are stored in the memory. The instructions may be executable to code input data in accordance with a coding method that allows for either coded data or messages to be transmitted with pre-determined, but unequal reliability over a communication channel. The coding method may allow the messages to be transmitted with higher reliability than the coded data. The instructions may also be executable to transmit the messages when they are available, and to otherwise transmit the coded data.

A computer-readable medium for facilitating unequal message protection is also disclosed. The computer-readable medium may include instructions. The instructions may be executable to code input data in accordance with a coding method that allows for either coded data or messages to be transmitted with pre-determined, but unequal reliability over a communication channel. The coding method may allow the messages to be transmitted with higher reliability than the coded data. The instructions may also be executable to transmit the messages when they are available, and to otherwise transmit the coded data.

A decoding method for providing unequal message protection is also disclosed. The method may include determining whether received data comprises alarm messages or coded data. If one or more alarm hypothesis messages are detected, the method may also include taking appropriate system actions in response to the alarm messages. If no alarm hypothesis messages are detected, the method may include decoding the coded data.

A balanced code may be used to create the coded data. In this case, decoding the coded data may include taking the inverse of operations used to implement the balanced code, and performing linear decoding. As another example, decoding the coded data may include mapping outputs of a linear decoder via a look-up table.

The methods described herein allow for the embedding of specific alarm or other signals that are to be transmitted with substantially greater reliability than coded data. The methods described herein do not involve the simultaneous transmission of unequally protected data, but rather allow for the transmission either of data with a lesser level of protection or messages/signals with a high level of protection, but not both greater or lesser protected data at the same time.

This type of transmission may be important in cases where a "mode change" may be required in an International Mobile Telecommunications-Advanced cellular system, e.g., in order to signal a transfer from space-diversity coding to space-division multiple access, or perhaps to indicate a lack of synchronization from a higher layer. The way this problem is currently solved is to have additional higher layer signaling; however, such an approach uses additional channel resources.

The way the current problem is posed and solved relates to another aspect of the present disclosure. This aspect has to do with the use of the Open Systems Interconnection (OSI) model of communications protocol design. The OSI model describes a functional partition of various elements in a communication system; e.g., the use of physical layer information transmitted within the physical layer, addressing information (what radio talks to what radio(s)) at the medium access control/link layers, etc.

This functional partition has traditionally meant that information transmitted from/to different layers is transmitted based on a transmission format partition of layering information, with the partition being done in time or frequency. For example, one snippet in time of a packet might correspond to a packet address, with another time-orthogonal snippet in time corresponding to user payload, with still another orthogonal snippet corresponding to an acknowledgement of a previous packet. However, recent advances in information theory imply that there are more reliable ways to transmit such information than a simple time or frequency division multiplexing based on an OSI functional partition. While the OSI functional partition may still be useful in designing the functions of the communication system, the actual transmission formatting need not be time-division multiplexed according to this model, but may be coded based on latency error-rate, and decoding procedures and complexity requirements.

Thus, the methods described herein allow for high priority pre-emptive signaling to be transmitted with higher reliability, in such a way that it reflects the prioritization of the different functional elements in the OSI model.

The basic idea behind this method of coding is to partition the set of symbols over the air into "messages" and "codewords" from a code, where there is an equal distribution of symbol types in the codewords (or an approximation thereto). By using such a code, for an M-ary symmetric channel, all codewords wind up being at a maximal Hamming distance from "messages" consisting of repetitions of symbols. With this method, a series of "messages" (which may be preemptions, alarm messages, or higher layer protocol messages and the like) may be transmitted in lieu of transmitting coded user data.

FIG. 1 illustrates a transmitting station 102 in electronic communication with a receiving station 104. The transmitting station 102 may be a base station, and the receiving station 104 may be a mobile station. Alternatively, the transmitting station 102 may be a mobile station, and the receiving station 104 may be a base station.

The transmitting station 102 includes an unequal message protection encoder 106. The receiving station 104 includes an unequal message protection decoder 108.

The unequal message protection encoder 106 may be configured to code input data 110 in accordance with a coding method that allows for either coded data 112 (which includes one or more codewords 118) or messages 114 to be transmitted with pre-determined, but unequal reliability over a communication channel 116. The coding method used by the unequal message protection encoder 106 allows the messages 114 to be transmitted with higher reliability than the coded data 112. The unequal message protection decoder 108 may be configured to decode signals that are transmitted by the unequal message protection encoder 106, and determine whether the signals include coded data 112 or messages 114.

Figure 2:
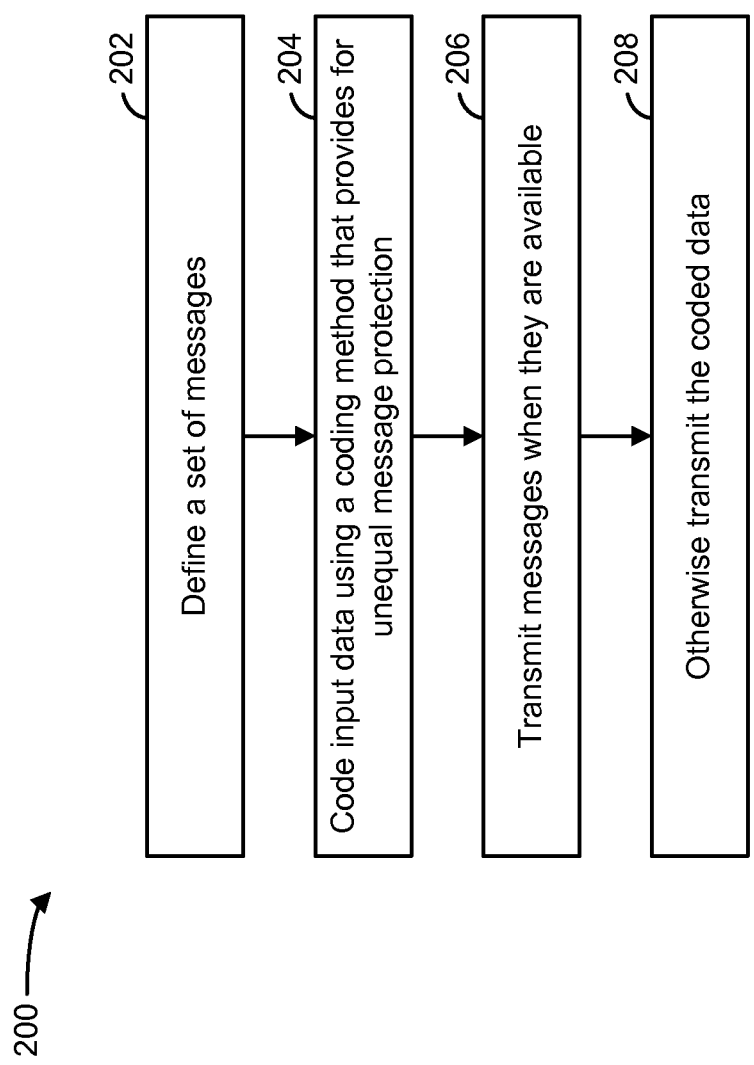
FIG. 2 illustrates a method for providing unequal message protection.

FIG. 2 illustrates a method 200 for providing unequal message protection. In accordance with the depicted method 200, a set of messages 114 may be defined 202. The messages 114 may be preemptions, alarm messages, higher layer protocol messages, etc. The messages 114 may include a repetition of identical symbols.

Input data 110 may be coded 204 using a coding method that provides unequal message protection, i.e., that allows the messages 114 to be transmitted with higher reliability than the coded data 112. For example, the coding method that is used may be selected so that there is an equal distribution of symbol types in the codewords 118 (or an approximation thereto), so that the codewords 118 are at a maximal Hamming distance from the messages 114.

Messages 114 may be transmitted 206 when they are available. Otherwise, the coded data 112 may be transmitted 208.

Figure 3:
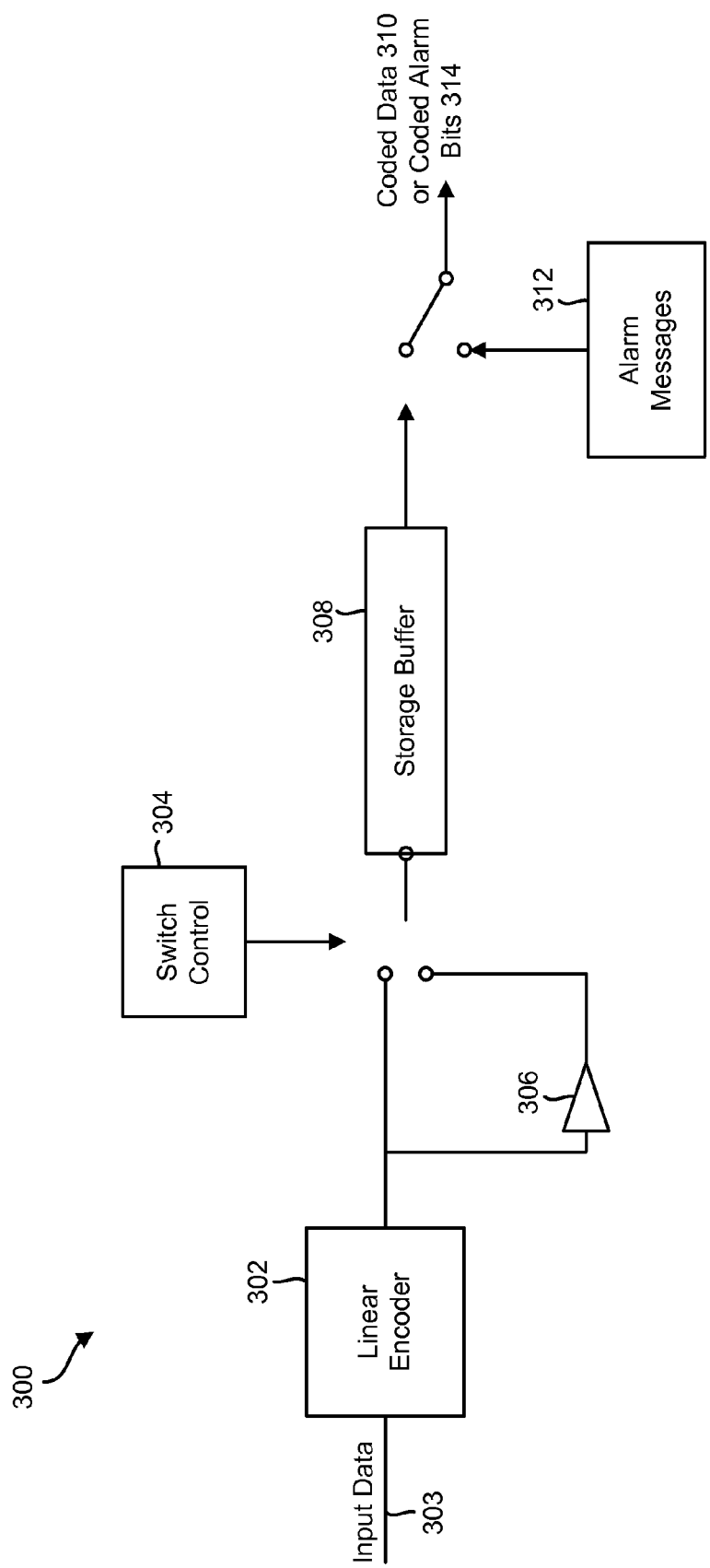
FIG. 3 illustrates an example of an unequal message protection encoder that is configured to produce a nonlinear balanced code.

FIG. 3 illustrates an example of an unequal message protection encoder 300 that is configured to produce a balanced code. Input data 303 may be provided to a linear encoder 302. The linear encoder 302 may utilize a block code, a convolutional code, etc.

A switch control 304 and an inverter 306 implement an inversion and switching scheme that, in effect, appends the complement of a bit to every bit. This concatenation is one form of a Manchester code. Thus, every codeword will be a balanced codeword (albeit at the expense of one-half of the signal energy). These coded and complement-coded bits may be stored in a buffer 308. When 2n coded bits are present, these may be transmitted as coded data 310 unless an alarm message 312 is present. If an alarm message 312 is present, 2n coded alarm bits 314 may be transmitted instead.

This class of codes may achieve arbitrarily low error rates as the encoder 302 length gets large and the alarm messages 312 are optimally separated from the combined codewords. There may be two alarm messages 312, the all zeros message and the all ones message.

This scheme may be generalized to non-binary symbols by mapping the non-binary symbols to binary symbols and with the inverter 306 understood as taking the logical complement of the binary equivalent of the non-binary symbols.

Figure 4:
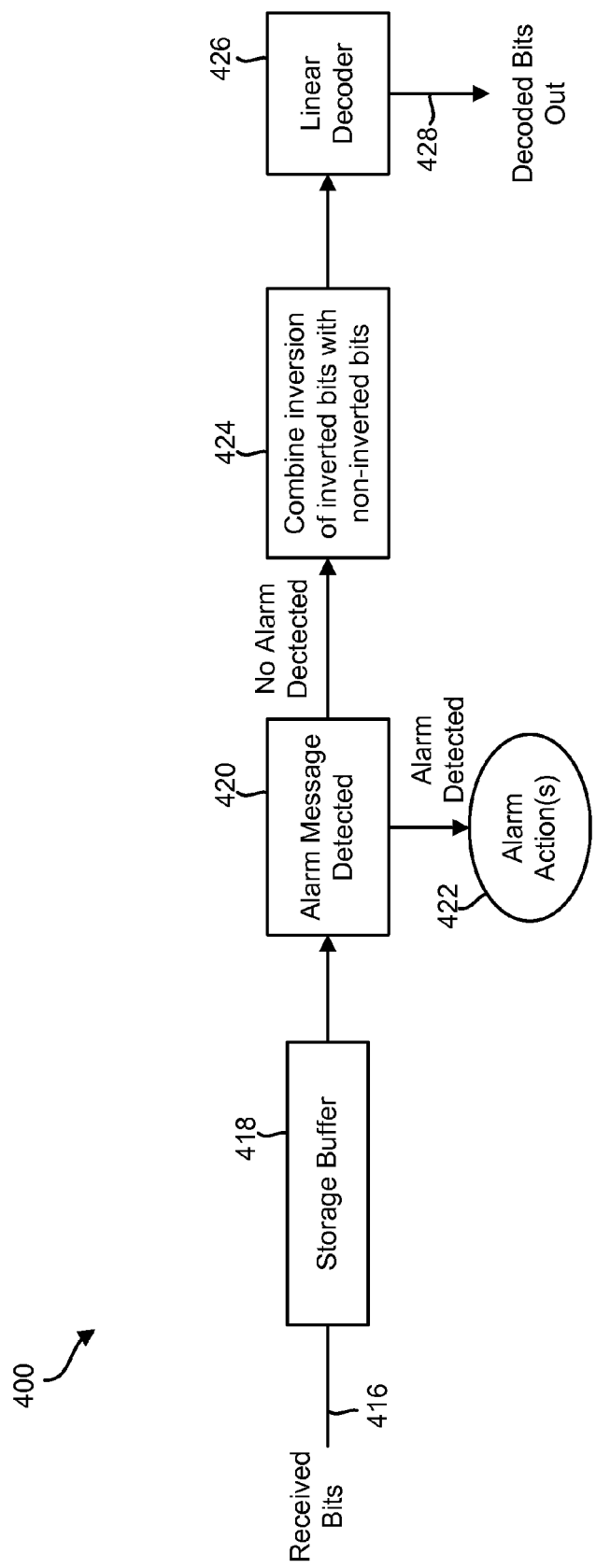
FIG. 4 illustrates an unequal message protection decoder that is configured to decode signals that are output by the unequal message protection encoder shown in FIG. 3.

FIG. 4 illustrates an unequal message protection decoder 400 that is configured to decode signals that are output by the unequal message protection encoder 300 shown in FIG. 3. It is assumed that there is synchronization between the transmitter and the receiver. On receive, 2n bits 416 (these can be soft-decisions) are received and stored in a buffer 418. These (soft) bits may then be compared, e.g., via matched filtering, to detect 420 if any "alarm" hypothesis messages are received. If one or more alarm hypothesis messages are detected 420, then appropriate system actions 422 may be taken.

If no alarm hypothesis messages are detected 420, then the inverse 424 of the multiplex and invert bit operations may be taken and linear decoding 426 may be performed, e.g., via maximum likelihood decoding, resulting in decoded bits 428.

Figure 5:
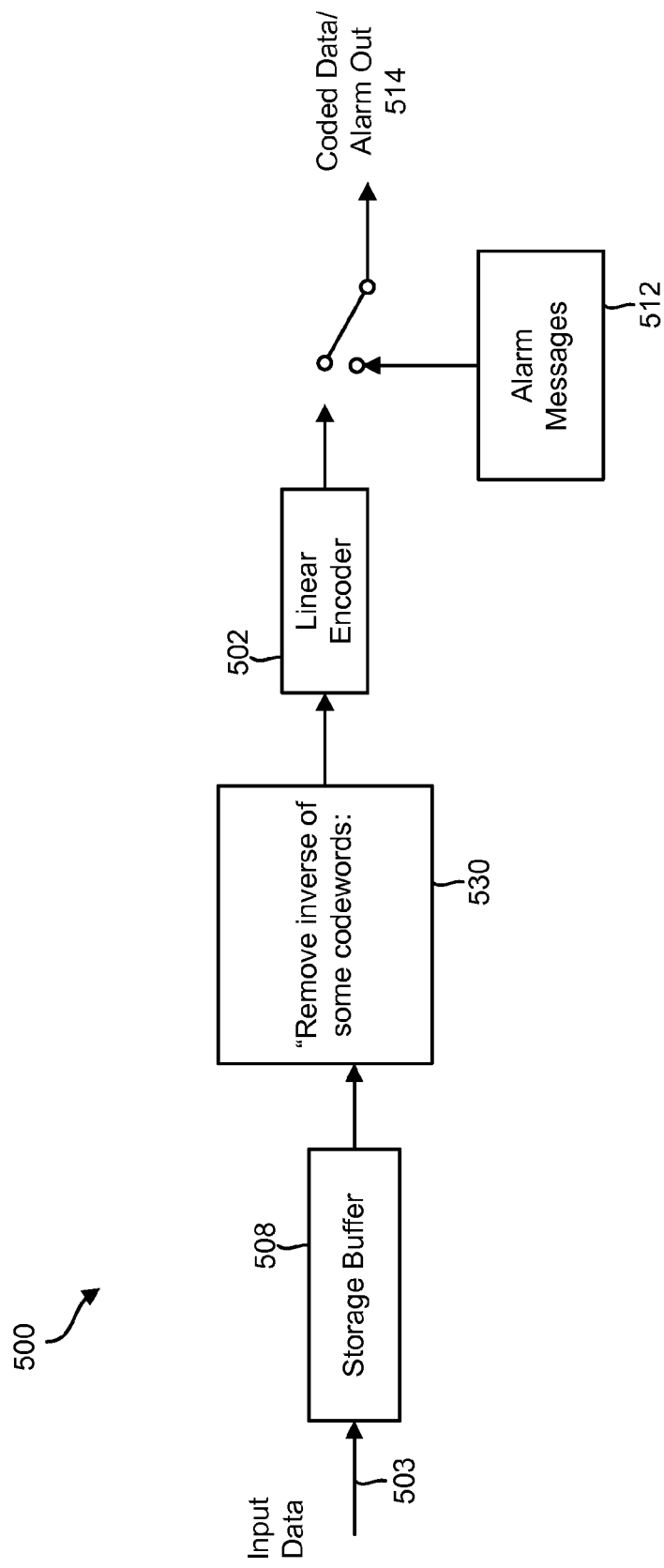
FIG. 5 illustrates another example of an unequal message protection encoder.

FIG. 5 illustrates another example of an unequal message protection encoder 500. Input data 503 may be sent into a storage buffer 508 of, e.g., k−1 bits. (This may be extended to other alphabets.) The operation of the block 530 titled "Remove inverse of some codewords" will now be described.

If the linear encoder function is considered as a mapping of k bits into n bits, it may be represented as:

$$T: S^{2^k} \to S^{2^n}$$

where the $$S^{2^k}$$

represents the set of all k bit sequences and $$S^{2^n}$$

represents the set of all n bit sequences.

Then we can write $$T[A] = \{y \in S^{2^n} \mid y = T(x) \text{ for all } x \in A\},$$

and we can also write $$T^{-1}[B] = \{x \in S^{2^k} \mid T(x) \in B\}.$$

We are interested in particular sets $T^{-1}[B]$ that give rise to certain encoder outputs that we do not want transmitted over the channel either because they will produce the same bit pattern as the alarm message signals or they produce codewords close to the alarm messages. Thus $T^{-1}[B]$ is a set of k bit sequences; this set will be referred to as the exclusion set, $\epsilon$. This set has a number of elements in it (each element is a k bit sequence); we denote the cardinality of this set by $|T^{-1}[B]|$ or $|\epsilon|$. Furthermore, we denote the set of all $2^k$ bit sequences that are not members of $\epsilon$, by $\epsilon^C$, since it is the complement of $\epsilon$, when considering the set of all k bit sequences. It has cardinality $|\epsilon^C|$.

The block 530 titled "Remove inverse of some codewords" may be configured to map (k−1) bit sequences into k bit sequences where the k bit sequences are restricted to be elements of $\epsilon^C$. This can always be done provided that the cardinality of $\epsilon^C \geq 2^{(k-1)}$.

Various exemplary embodiments producing different unequal error protection message transmission can then be described by varying the set B which in turn varies the set $\epsilon$ of excluded k bit sequences. The following three cases are provided as examples.

Case 1:

$$B = \{y \in S^{2^n} \mid y = \text{are repetitions of a single symbol}\}$$

ensures that repetitions of alarm messages do not appear in the codeword output.

Case 2:

$$B = \{y \in S^{2^n} \mid y = \text{within Hamming distance } \delta \text{ of repetitions of a single symbol}\}$$

ensures that the code outputs are always at least a Hamming distance greater than $\delta$ from the alarm messages. However, it is not possible to do this for all Hamming distances $\delta$; for binary sequences $\delta$ must be substantially smaller than n/2. The value of $\delta$ determines the size of $|\epsilon|$, and therefore also of $\epsilon^C$. In general then, for this approach we require $\delta \leq \delta_0$ where $\delta_0$ is the largest value of $\delta$ for which $\epsilon^C \geq 2^{(k-1)}$.

Case 3:

$$B = \{y \in S^{2^n} \mid y = \text{all codewords' symbols that have a specified distribution}\}$$

ensures that all codeword outputs have a specified distribution of symbols. This case may be thought of as subsuming case 2 above, when the distribution of symbols is considered to be those within a Hamming distance of the message symbols.

Each of these embodiments provides a different realization or approximation to the optimal coder.

The block 530 titled "Remove inverse of some codewords" may be formed essentially with a look-up table, where a series of k bits may be output from k−1 input bits which could be generated at the very least by brute force numerical evaluation of the linear code's output for given inputs.

There are many ways to build such a table. For example, once the set $\epsilon^C$ is determined, the entries of $\epsilon^C$ may be ordered from lowest to highest taking each k bit sequence as if it were an unsigned integer. Then one could take the first $2^{(k-1)}$ entries, and the mapping between the k−1 bit inputs and the first $2^{(k-1)}$ entries of the ordering of $\delta^C$ would define the non-linear mapping. Alternatively one may take the highest $2^{(k-1)}$ entries.

Implicit in the above are restrictions on k, n, and k/n. Although the exact bounds on the restrictions are beyond the scope of the present disclosure (as noted above, relatively "good" codes, which provide high coding gain for the rate, will have few codewords close to repetitions of a single symbol, and hence are candidates for this design method), we can note the following:

The rate of the code k/n should not be very close to unity.

The input number of bits k−1 should be relatively large compared to unity.

The linear code should have codewords whose empirical distribution approximates a Bernouli (for binary alphabets) or multinomial distribution (for M-ary alphabets) when input symbols' distribution are independent and identically distributed. Conversely, one can also use codes whose symbols' distribution has centered even order moments smaller than that predicted by a Gaussian approximation via the de Moivre Laplace Theorem, e.g., for s=1, 2, . . . , then the moments of the distribution should be smaller than $$\frac{(2s)!}{2^s s!}(n/4)^{2s}.$$

In this case, if k−1 is relatively large, then one may invoke Central Limit Theorem or de Moivre-Laplace Theorem arguments to bound the number of codewords that can be excluded and hence set limits on $\delta$ in an embodiment above.

Figure 6:
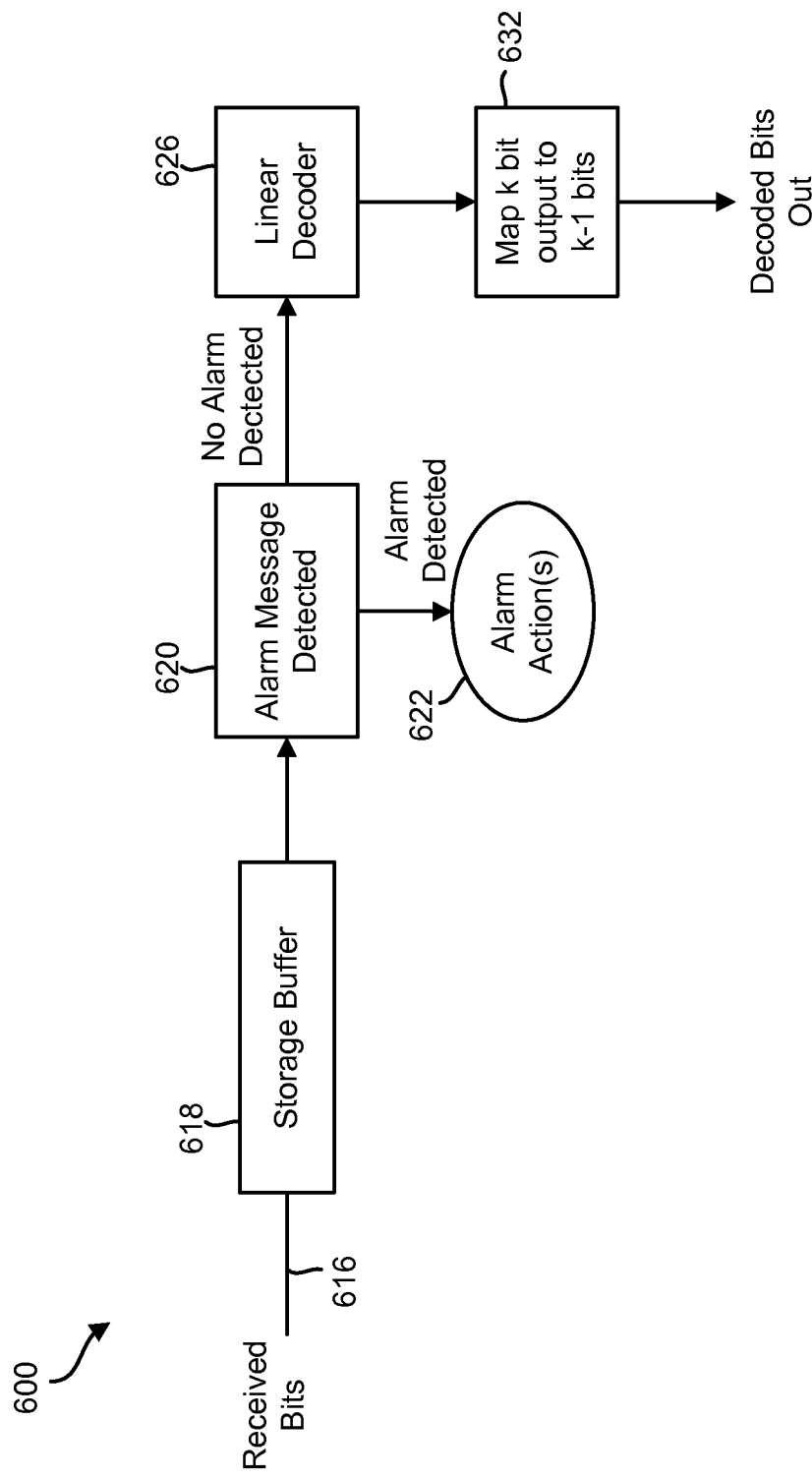
FIG. 6 illustrates an unequal message protection decoder that is configured to decode signals that are output by the unequal message protection encoder shown in FIG. 5.

FIG. 6 illustrates an unequal message protection decoder 600 that is configured to decode signals that are output by the unequal message protection encoder 500 shown in FIG. 5.

On receive, 2n bits 616 (these can be soft-decisions) are received and stored in a buffer 618. These (soft) bits may then be compared, e.g., via matched filtering, to detect 620 if any "alarm" hypothesis messages are received. If one or more alarm hypothesis messages are detected 620, then appropriate system actions 622 may be taken. If no alarm hypothesis messages are detected 620, then linear decoding 626 may be performed.

Hard outputs of the linear decoder 626 may be mapped 632 via a look-up table that is the inverse of the block 530 titled "Remove inverse of some codewords" of FIG. 5 to recover the k−1 input bits.

Alternatively, the block 632 titled "Map k bit output to k−1 bits" could be incorporated into the linear decoder 626. In this case, the linear decoder 626 would have state transitions limited to those allowable from the input k−1 bits and the block 530 titled "Remove inverse of some codewords" of FIG. 5.

Figure 7:
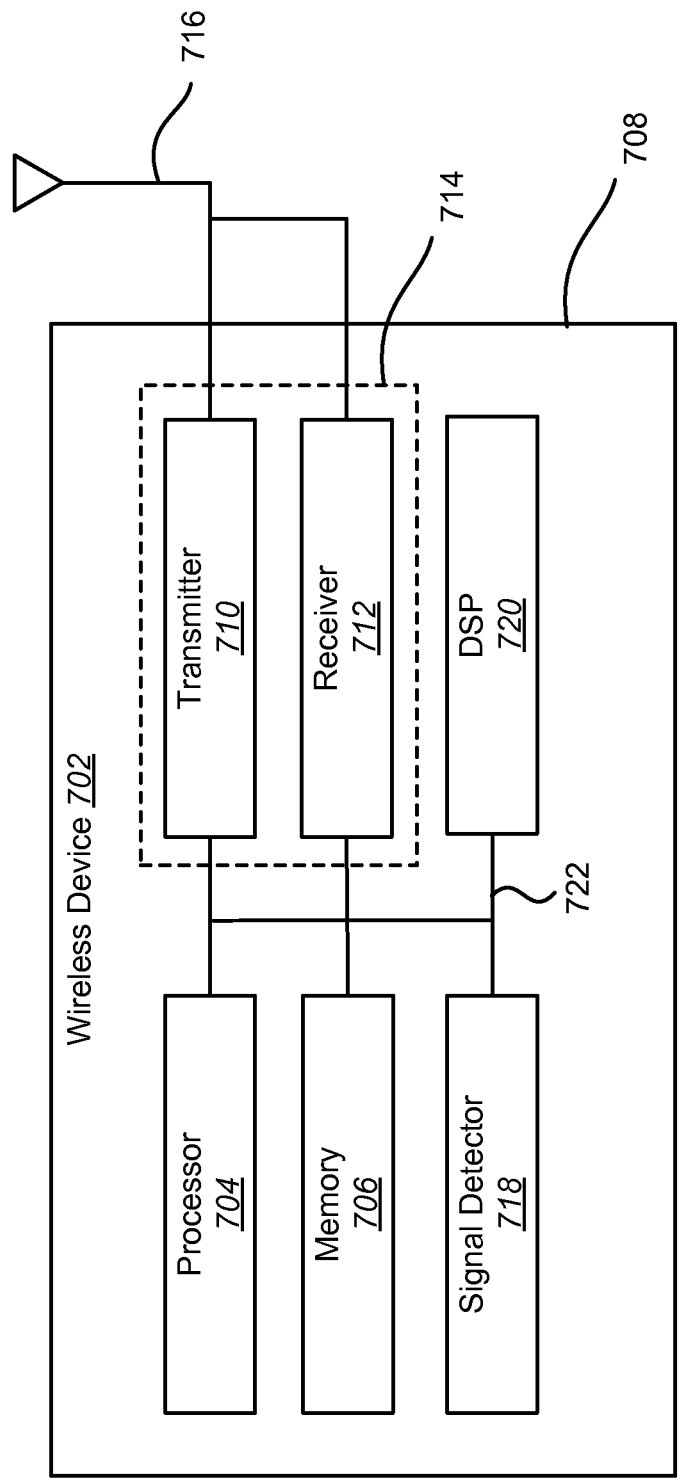
FIG. 7 illustrates various components that may be utilized in a wireless device.

FIG. 7 illustrates various components that may be utilized in a wireless device 702. The wireless device 702 is an example of a device that may be configured to implement the methods described herein. The wireless device 702 may be a base station or a mobile station.

The wireless device 702 may include a processor 704 which controls operation of the wireless device 702. The processor 704 may also be referred to as a central processing unit (CPU). Memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods described herein.

The wireless device 702 may also include a housing 708 that may include a transmitter 710 and a receiver 712 to allow transmission and reception of data between the wireless device 702 and a remote location. The transmitter 710 and receiver 712 may be combined into a transceiver 714. An antenna 716 may be attached to the housing 708 and electrically coupled to the transceiver 714. The wireless device 702 may also include (not shown) multiple transmitters, multiple receivers, multiple transceivers and/or multiple antenna.

The wireless device 702 may also include a signal detector 718 that may be used to detect and quantify the level of signals received by the transceiver 714. The signal detector 718 may detect such signals as total energy, pilot energy per pseudonoise (PN) chips, power spectral density, and other signals. The wireless device 702 may also include a digital signal processor (DSP) 720 for use in processing signals.

The various components of the wireless device 702 may be coupled together by a bus system 722 which may include a power bus, a control signal bus, and a status signal bus in addition to a data bus. However, for the sake of clarity, the various buses are illustrated in FIG. 7 as the bus system 722.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing unequal message protection, comprising:
coding input data in accordance with a coding method that allows for either coded data or messages to be transmitted with pre-determined, but unequal reliability over a communication channel, wherein the coding method allows the messages to be transmitted with higher reliability than the coded data, and wherein the coding method comprises:
encoding the input data with a linear encoder;
appending a complement of a bit to every bit of encoded input data to obtain a balanced codeword, wherein each codeword is at a maximal Hamming distance from the messages;
utilizing a balanced code, wherein the balanced code is approximated by a linear code preceded by a non-linear function which removes non-balanced codewords within a Hamming distance d of repetitions of a single symbol, where d is a positive number; and
storing the balanced codewords in a buffer for transmission;
transmitting the messages when they are available; and otherwise transmitting the coded data, and
wherein at least one of the messages to be transmitted with higher reliability comprises repetitions of one symbol.

2. The method of claim 1, wherein the messages to be transmitted represent system control messages.

3. The method of claim 1, wherein the coding method results in codewords with a specified fixed distribution of symbols.

4. The method of claim 1, wherein the balanced code comprises a Manchester code or a code isomorphic to a Manchester code.

5. A wireless device that is configured to provide unequal message protection, comprising:
a processor;
memory in electronic communication with the processor;
instructions stored in the memory, the instructions being executable to:
coding input data in accordance with a coding method that allows for either coded data or messages to be transmitted with pre-determined, but unequal reliability over a communication channel, wherein the coding method allows the messages to be transmitted with higher reliability than the coded data, and wherein the coding method comprises:
encoding the input data with a linear encoder;
appending a complement of a bit to every bit of encoded input data to obtain a balanced codeword, wherein each codeword is at a maximal Hamming distance from the messages;
utilizing a balanced code, wherein the balanced code is approximated by a linear code preceded by a non-linear function which removes non-balanced codewords within a Hamming distance d of repetitions of a single symbol, where d is a positive number; and
storing the balanced codewords in a buffer for transmission;
transmitting the messages when they are available; and otherwise transmitting the coded data, and
wherein at least one of the messages to be transmitted with higher reliability comprises repetitions of one symbol.

6. The wireless device of claim 5, wherein the messages to be transmitted represent system control messages.

7. The wireless device of claim 5, wherein the coding method results in codewords with a specified fixed distribution of symbols.

8. The wireless device of claim 5, wherein the balanced code comprises a Manchester code or a code isomorphic to a Manchester code.

9. A non-transitory computer-readable medium comprising executable instructions for:
coding input data in accordance with a coding method that allows for either coded data or messages to be transmitted with pre-determined, but unequal reliability over a communication channel, wherein the coding method allows the messages to be transmitted with higher reliability than the coded data, and wherein the coding method comprises:
encoding the input data with a linear encoder;
appending a complement of a bit to every bit of encoded input data to obtain a balanced codeword, wherein each codeword is at a maximal Hamming distance from the messages;
utilizing a balanced code, wherein the balanced code is approximated by a linear code preceded by a non-linear function which removes non-balanced codewords within a Hamming distance d of repetitions of a single symbol, where d is a positive number; and
storing the balanced codewords in a buffer for transmission;
transmitting the messages when they are available; and otherwise transmitting the coded data, and
wherein at least one of the messages to be transmitted with higher reliability comprises repetitions of one symbol.

10. The non-transitory computer-readable medium of claim 9, wherein the messages to be transmitted represent system control messages.

11. The non-transitory computer-readable medium of claim 9, wherein the coding method results in codewords with a specified fixed distribution of symbols.

12. The non-transitory computer-readable medium of claim 9, wherein the balanced code comprises a Manchester code or a code isomorphic to a Manchester code.

13. A decoding method for providing unequal message protection, comprising:
receiving received data;
storing the received data in a buffer as soft bits;
determining whether received data comprises alarm messages or coded data by comparing the soft bits,
wherein the alarm messages are transmitted with higher reliability than the coded data by comprising repetitions of one symbol,
wherein the coded data is linearly encoded input data and obtaining balanced codeword by appending a compliment of bit to every bit of linearly encoded input data,
wherein each codeword is at a maximal Hamming distance from the message,
wherein the coded data utilize a balance code by a linear code preceded by a non-linear function which removes non-balanced codewords within a Hamming distance d of repetitions of a single symbol, where d is a positive number;
if one or more alarm hypothesis messages are detected, then taking appropriate system actions in response to the alarm messages; and if no alarm hypothesis messages are detected, decoding the coded data.

14. The decoding method of claim 13, wherein decoding the coded data comprises:
taking the inverse of operations used to implement the balanced code; and performing linear decoding.

15. The decoding method of claim 13, wherein decoding the coded data comprises mapping outputs of a linear decoder via a look-up table.

* * * * *

UNITED STATES PATENT AND TRADEMARK OFFICE
CERTIFICATE OF CORRECTION

PATENT NO. : 8,619,901 B2  Page 1 of 1
APPLICATION NO. : 12/110191
DATED : December 31, 2013
INVENTOR(S) : Kowalski et al.

It is certified that error appears in the above-identified patent and that said Letters Patent is hereby corrected as shown below:

In the Claims

Claim 1, column 9, line 24 please delete "distance d" and replace it with --distance $\delta$--.

Claim 1, column 9, line 25 please delete "where d" and replace it with --where $\delta$--.

Claim 5, column 9, line 61 please delete "distance d" and replace it with --distance $\delta$--.

Claim 5, column 9, line 62 please delete "where d" and replace it with --where $\delta$--.

Claim 9, column 10, line 29 please delete "distance d" and replace it with --distance $\delta$--.

Claim 9, column 10, line 30 please delete "where d" and replace it with --where $\delta$--.

Claim 13, column 10, line 62 please delete "distance d" and replace it with --distance $\delta$--.

Claim 13, column 10, line 63 please delete "where d" and replace it with --where $\delta$--.

Signed and Sealed this
Twentieth Day of May, 2014

Michelle K. Lee
*Deputy Director of the United States Patent and Trademark Office*